(12) United States Patent
Devaux

(10) Patent No.: US 10,969,803 B2
(45) Date of Patent: Apr. 6, 2021

(54) MECHANICAL ACTIVATION SYSTEM

(71) Applicant: CIRCOR INTERNATIONAL, INC., Burlington, MA (US)

(72) Inventor: Fabien Devaux, Saint Maur des Fosses (FR)

(73) Assignee: CIRCOR INTERNATIONAL, INC., Burlington, MA (US)

( * ) Notice: Subject to any disclaimer, the term of this patent is extended or adjusted under 35 U.S.C. 154(b) by 121 days.

(21) Appl. No.: 16/119,164

(22) Filed: Aug. 31, 2018

(65) Prior Publication Data

US 2020/0073416 A1 Mar. 5, 2020

(51) Int. Cl.
*G05D 9/04* (2006.01)
*F16H 25/18* (2006.01)
*F16K 31/524* (2006.01)

(52) U.S. Cl.
CPC .............. *G05D 9/04* (2013.01); *F16H 25/18* (2013.01); *F16K 31/52408* (2013.01)

(58) Field of Classification Search
CPC ........ F16K 21/16; F16K 21/18; F16K 31/524; F16K 31/52408; F16K 31/52475; F16K 31/52483; F16H 25/18; F16H 25/186; F16H 37/122; F16H 37/124; F16H 37/126; F16H 55/32; F16H 55/36; G05D 9/04; G05D 16/103; G05D 16/16; G05D 16/166; Y10T 137/27; Y10T 137/7287; Y10T 137/7498; F16N 19/00; F16N 19/003; F16N 19/006; F16N 2270/10; F16N 2270/12; F16N 2270/18; F16N 2270/60; F16N 2270/62; F16N 2270/64
See application file for complete search history.

(56) References Cited

U.S. PATENT DOCUMENTS

| | | | |
|---|---|---|---|
| 6,240,954 B1 * | 6/2001 | Bereznai | F16K 31/265 137/312 |
| 7,866,336 B1 * | 1/2011 | Gutierrez | F16K 31/001 137/312 |
| 2016/0298739 A1 * | 10/2016 | Bottacini | F16H 25/18 |
| 2018/0031179 A1 * | 2/2018 | Divisi | F16N 13/02 |

FOREIGN PATENT DOCUMENTS

| | | | |
|---|---|---|---|
| GB | 1045815 A | 10/1966 | |
| GB | 1217134 A | * 12/1970 | .............. F15B 15/06 |
| GB | 1499149 A | 1/1978 | |

* cited by examiner

*Primary Examiner* — Hailey K. Do
(74) *Attorney, Agent, or Firm* — Kacvinsky Daisak Bluni PLLC

(57) ABSTRACT

A mechanical activation system including a first mechanical device mechanically connectable to and controllable by an external device, with a rotational orientation of the first mechanical device controllable by the external device, the rotational orientation representative of a parameter of the external device. The first mechanical device and second mechanical device having interacting surfaces for controlling a valve for preventing the parameter of the external device from reaching a critical value. An operator actuation device interacts with a surface of the first mechanical device, permitting a single operator input that is automatically resettable by the system.

20 Claims, 19 Drawing Sheets

MECHANICAL ACTIVATION SYSTEM

FIELD OF THE INVENTION

The present invention is directed to a mechanical activation system, and more specifically to mechanical activation system for maintaining a fluid level in a device.

BACKGROUND OF THE INVENTION

Fluid systems are widely used to control components in devices. For example, aircraft utilize fluid systems to control flight control surfaces. While maintenance is being performed, workers may need to override normal operational settings, for such reasons as replenishing working fluid or for other reasons. Often, the settings must be manually reset upon completion of maintenance. Failure to return the aircraft to the normal operational settings upon completion of maintenance may result in improper aircraft operations.

What is needed is a mechanical system that does not suffer from these drawbacks.

SUMMARY OF THE INVENTION

The present invention relates to a mechanical activation system including a rotatable first mechanical device mechanically connectable to an external device, a rotational orientation of the first mechanical device controllable by the external device, the rotational orientation representative of a parameter of the external device. The mechanical activation system further includes a pivotable second mechanical device slidably supported in a disengaged position by a first cam surface of the first mechanical device. The mechanical activation system further includes, in response to the parameter reaching a predetermined threshold critical value, at least a portion of the first mechanical device being urged into rotational movement to a predetermined rotational orientation, and the second mechanical device being urged from the disengaged position to an engaged position for opening a valve for preventing the parameter from reaching a critical value. The mechanical activation system further includes an operator actuation device in an engaged position in contact with a second cam surface of the first mechanical device. The mechanical activation system further includes, in response to the operator actuation device being manually actuated from the engaged position to a disengaged position, the second cam surface being urged into rotational movement to urge the second mechanical device from the engaged position toward the disengaged position, and the operator actuation device being automatically returnable to the engaged position by the system.

The present invention further relates to a mechanical activation system including a rotatable first mechanical device including a pulley for receiving an elongated member extending between the pulley and an external device, a rotational orientation of the pulley controllable by the external device, the rotational orientation representative of a parameter of the external device. The mechanical activation system further includes a first cam having a first cam surface, a second cam having a second cam surface and a third cam surface, and a pivotable second mechanical device slidably supported in a disengaged position by the first cam surface. The mechanical activation system further includes in response to the parameter reaching a predetermined threshold critical value, the pulley and the first cam being urged into rotational movement to a predetermined rotational orientation, the second mechanical device being urged from the disengaged position to an engaged position for opening a valve for preventing the parameter from reaching a critical value. The mechanical activation system further includes an operator actuation device in an engaged position in contact with the second cam surface. The mechanical activation system further includes, in response to the operator actuation device being manually actuated from the engaged position to a disengaged position, the second cam being urged into rotational movement, the third cam surface urging the second mechanical device from the engaged position toward the disengaged position. The mechanical activation system further includes the operator actuation device being automatically returnable to the engaged position by the system.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Provided is an embodiment of the mechanical activation system to secure automatically a minimum of a fluid in a container, and then, by only a single action or input from an operator, such as a maintenance operator, permit refilling of the container with the fluid.

Figure 1:
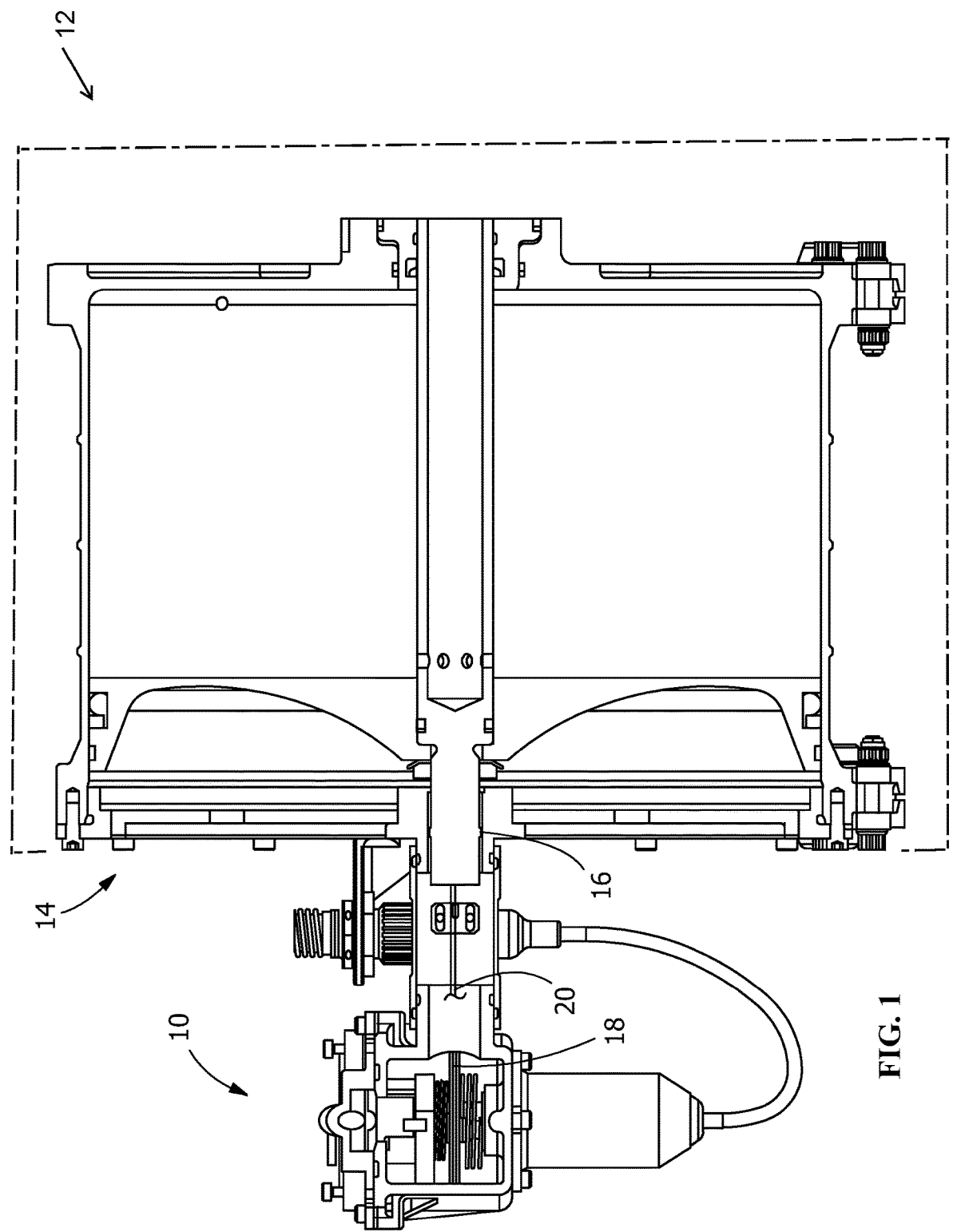
FIG. 1 is an elevation view of an exemplary mechanical activation system.

FIG. 1 shows mechanical activation system 10 mechanically connected to an external device 12. More specifically, a pulley 18 of mechanical activation system 10 receives an elongated member 20 extending between pulley 18 and a plunger 16 associated with external device 12 including a reservoir 14. In other words, the fluid level of reservoir 14, which directly corresponds to the position of plunger 16, likewise directly corresponds to an angular orientation of pulley 18. Stated another way, the rotational orientation of pulley 18 is representative of the fluid level of reservoir 14 of external device 12.

Figure 2:
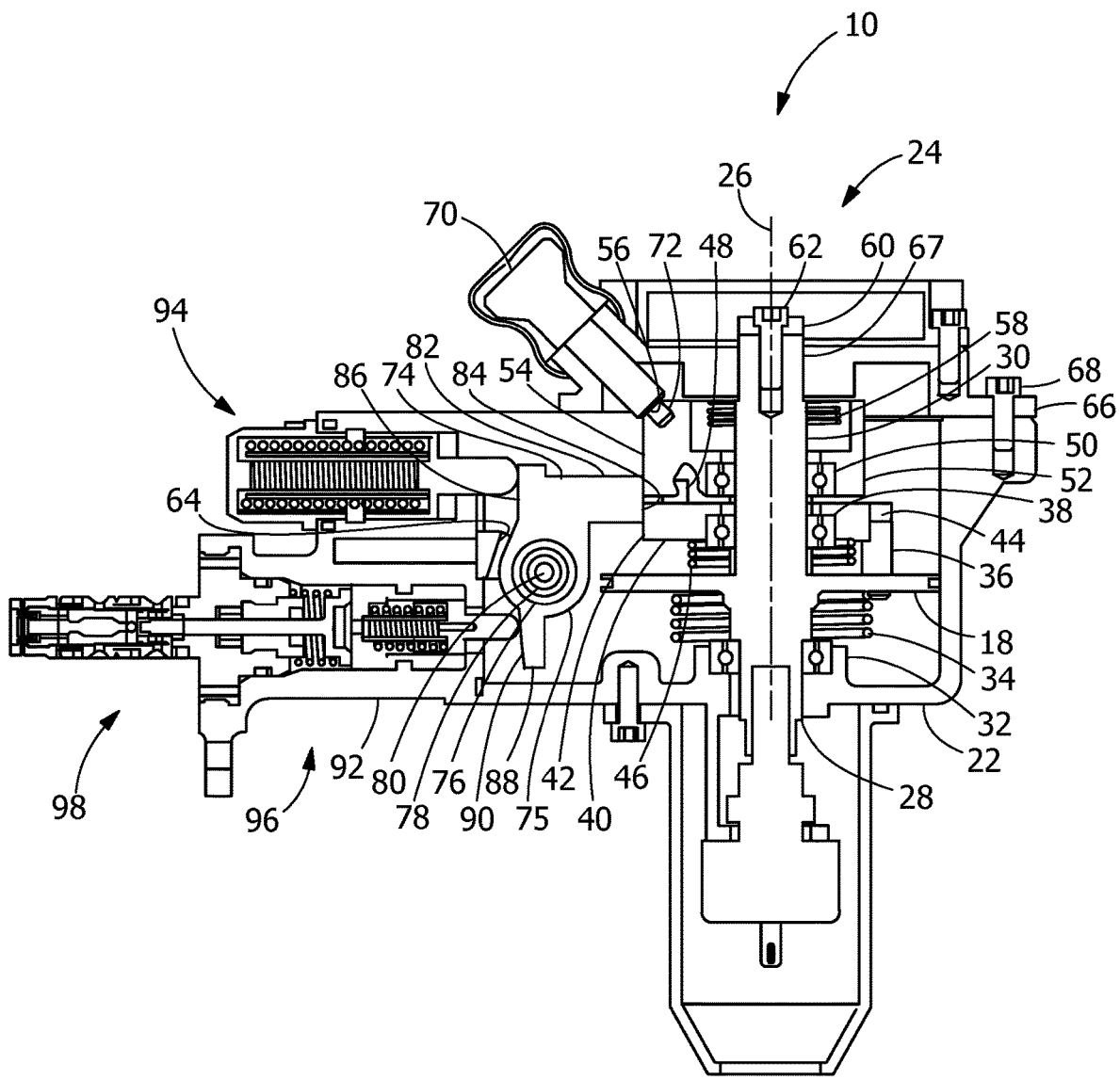
FIG. 2 is a cross-section of the mechanical activation system of FIG. 1.
Figure 3:
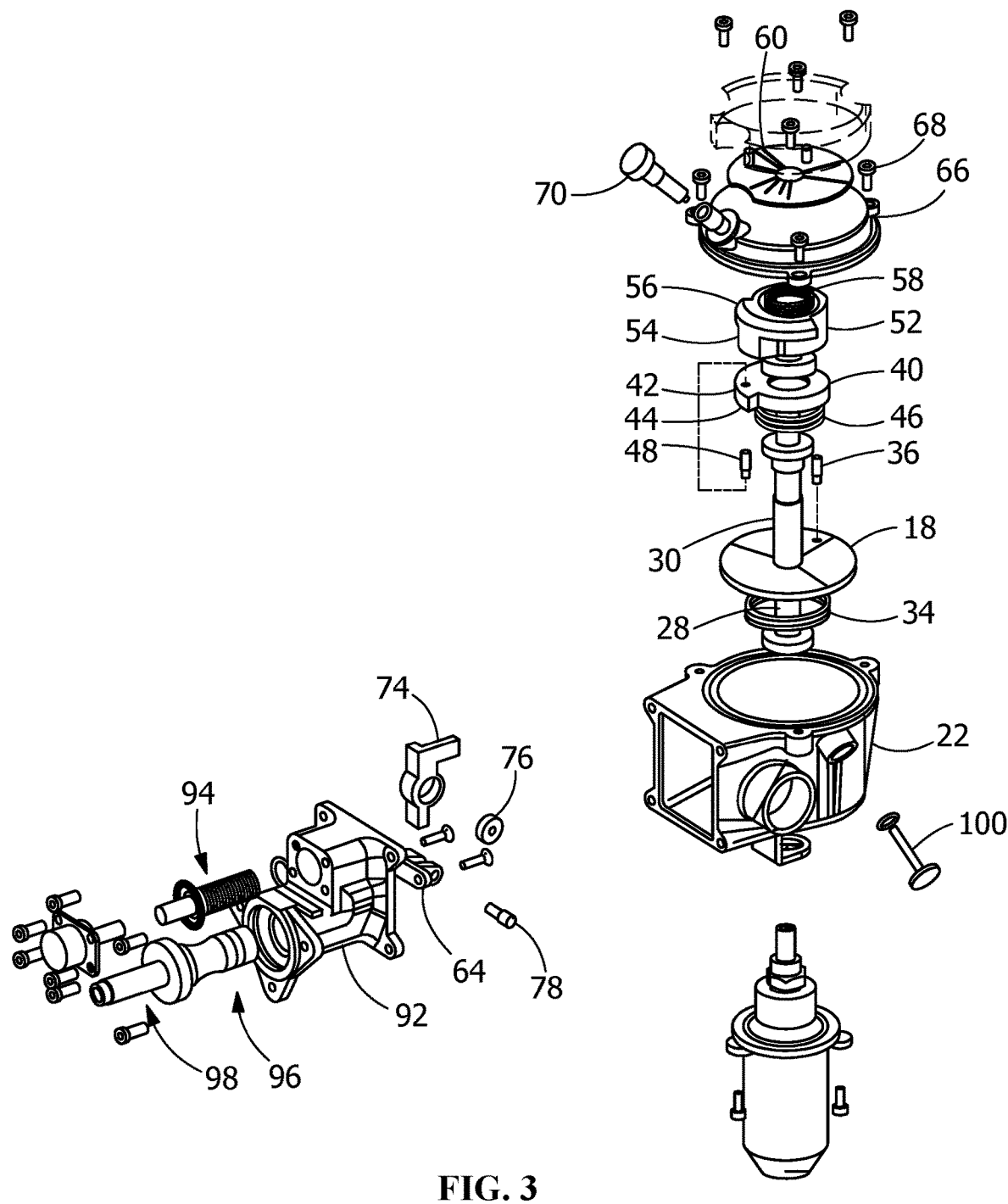
FIG. 3 is an exploded view of the mechanical activation system of FIG. 1.

FIG. 2 shows a cross-section of mechanical activation system 10, and FIG. 3 is an exploded view of mechanical activation system 10. As collectively shown in FIGS. 2 and 3, a mechanical device 24 rotates about an axis 26 inside of housing 22 and housing portion 66. Mechanical device 24 includes pulley 18 extending to a shaft portion 28 in one direction along axis 26, and mechanical device 24 further extending from pulley 18 to a shaft portion 30 in an opposed direction along axis 26. As shown, pulley 18 and shaft portions 28, 30 are of unitary or one-piece construction. Shaft portion 28 is rotatably carried by bearing 32 secured in housing 22. Shaft portion 30 extends through and is rotatably guided by an opening 67 formed in housing portion 66. A pointer or indicator 60 is secured to an end of shaft portion 30 opposite pulley 18 by a fastener 62. A torque biasing member 34 such as a spring is connected at one end to pulley 18 and to housing 22 at the other end for maintaining tension in elongated member 20 (FIG. 1) in response to fluctuating fluid levels of reservoir 14 (FIG. 1). Mechanical device 24 further includes a cam 40 that is rotatably carried about axis 26 by bearings 38 secured to shaft portion 30. Cam 40 has a cam surface 42 that include a pair of shoulders 44 (only one shoulder 44 is shown in each of FIGS. 2 and 3). A protrusion 36, such as a pin is secured in pulley 18, extending from a surface of pulley 18 facing cam 40 in a direction generally parallel to axis 26, is sized and positioned to engage each shoulder 44 of the pair shoulders 44 of cam 40 as a result of sufficient relative rotational movement about axis 26 between pulley 18 and cam 40. In one embodiment, protrusion 36 is of unitary or one-piece construction with pulley 18. A torque biasing member 46 such as a spring is connected at one end to cam 40 and is connected at the other end to pulley 18, thereby mechanically connecting cam 40 and pulley 18.

As further shown in FIGS. 2 and 3, mechanical device 24 further includes a cam 52 that is rotatably carried about axis 26 by bearings 50 secured to shaft portion 30. Cam 52 has cam surfaces 54, 56. A torque biasing member 58 such as a spring is connected at one end to cam 52, and connected at the other end to housing portion 66 that is secured to housing 22 by fasteners 68 (only one fastener 68 is shown in FIG. 2). A protrusion 48 extending from a surface facing cam 52 in a direction generally parallel to axis 26 is sized and positioned to engage a shoulder 122 (FIG. 18) of cam surface 54 of cam 52. An operator actuation device 70 is secured in housing portion 66 and includes a retractable tip 72. For purposes herein, when tip 72 extends past the body of operator actuation device 70, operator actuation device 70 is in an engaged position 112 (FIG. 19) for engaging a shoulder 114 (FIG. 19) associated with cam surface 56 of cam 52, and when tip 72 is manually retracted inside of the body of operator actuation device 70, such as by a maintenance worker, operator actuation device 70 is in a disengaged position 116 (FIG. 18) for slidably engaging cam surface 56 of cam 52, as will be discussed in further detail below.

Figure 4:
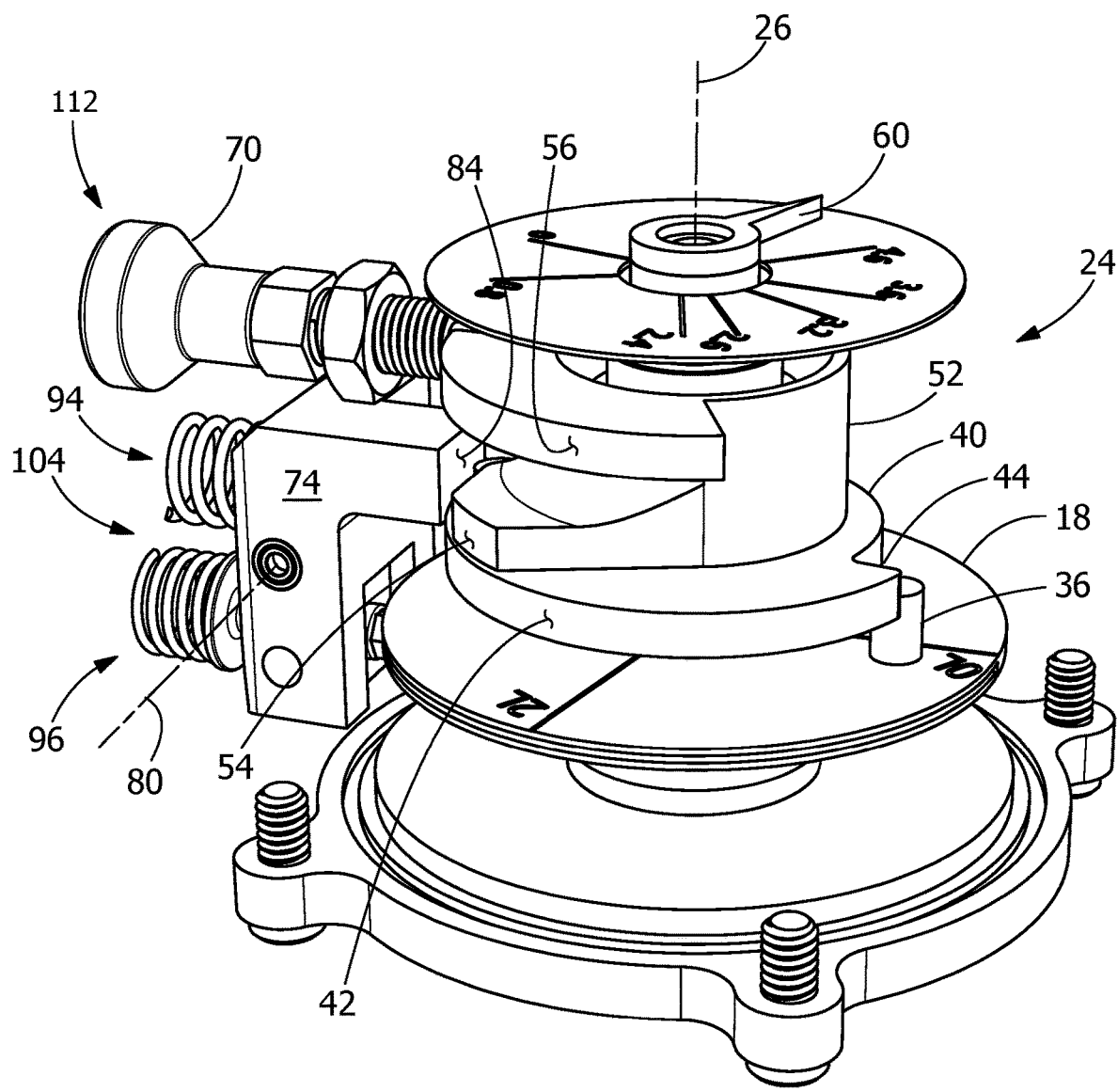
FIG. 4 is an upper perspective view of an exemplary mechanical activation system.
Figure 5:
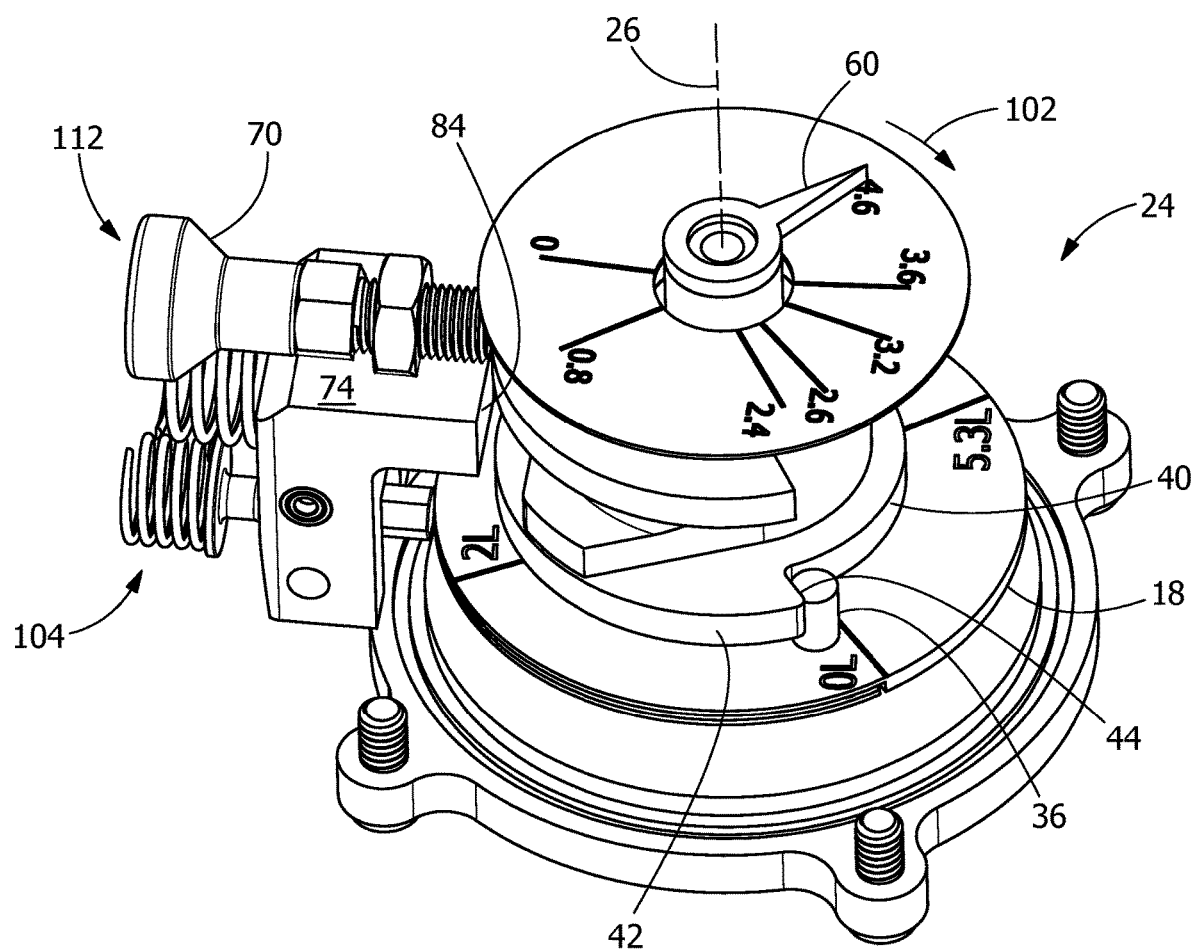
FIG. 5 is an upper perspective view of the mechanical activation system of FIG. 4, after rotational movement of at least a portion of a mechanical device 24 in a clockwise direction.
Figure 6:
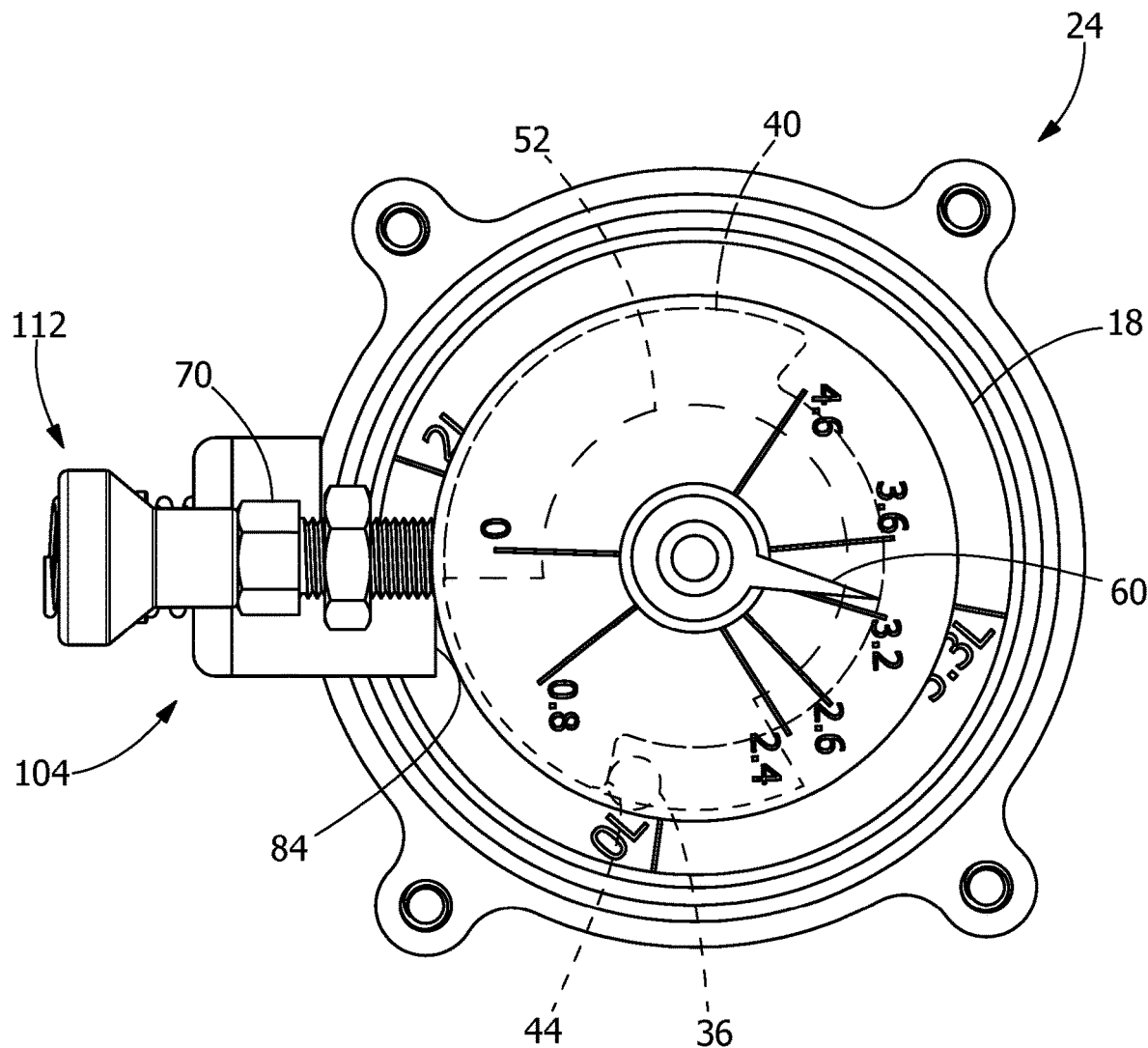
FIG. 6 is a plan view of the mechanical activation system of FIG. 5, after rotational movement of at least a portion of mechanical device 24 in a clockwise direction.
Figure 7:
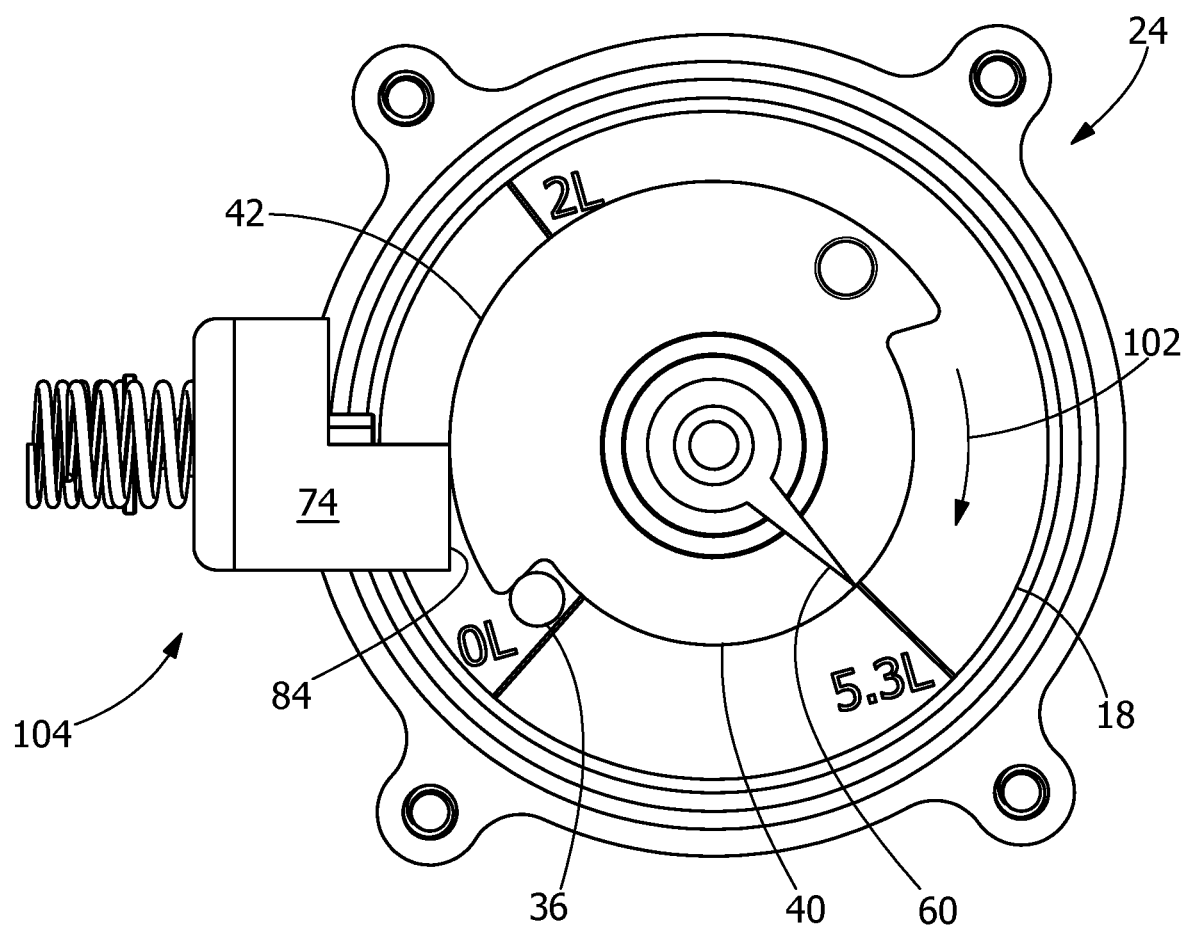
FIG. 7 is a plan view of the mechanical activation system of FIG. 6, after removal of several components for purposes of clarity, and after rotational movement of at least a portion of mechanical device 24 in a clockwise direction.
Figure 9:
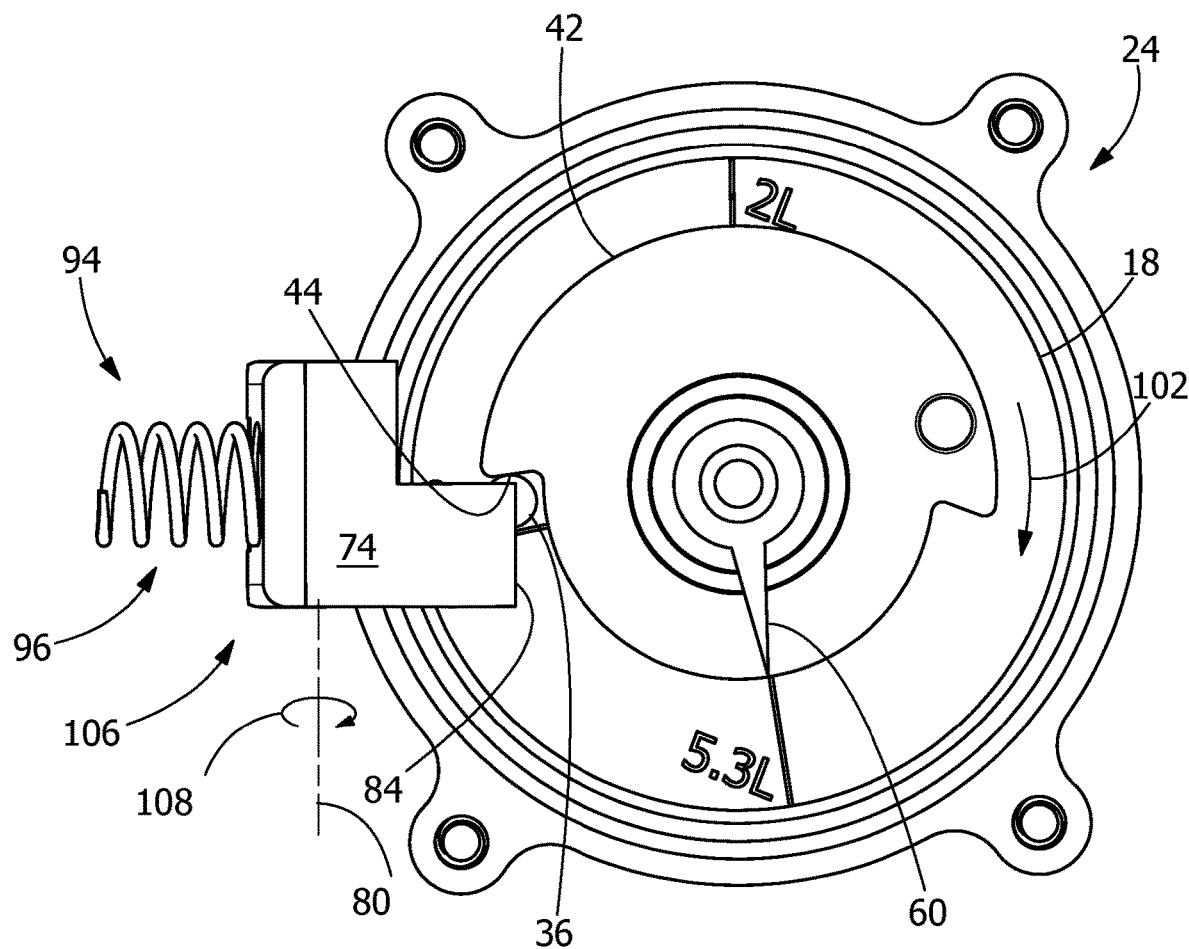
FIG. 9 is a plan view of the mechanical activation system of FIG. 8, after rotational movement of at least a portion of mechanical device 24 in a clockwise direction, resulting in mechanical device 74 being urged from a disengaged position to an engaged position.
Figure 10:
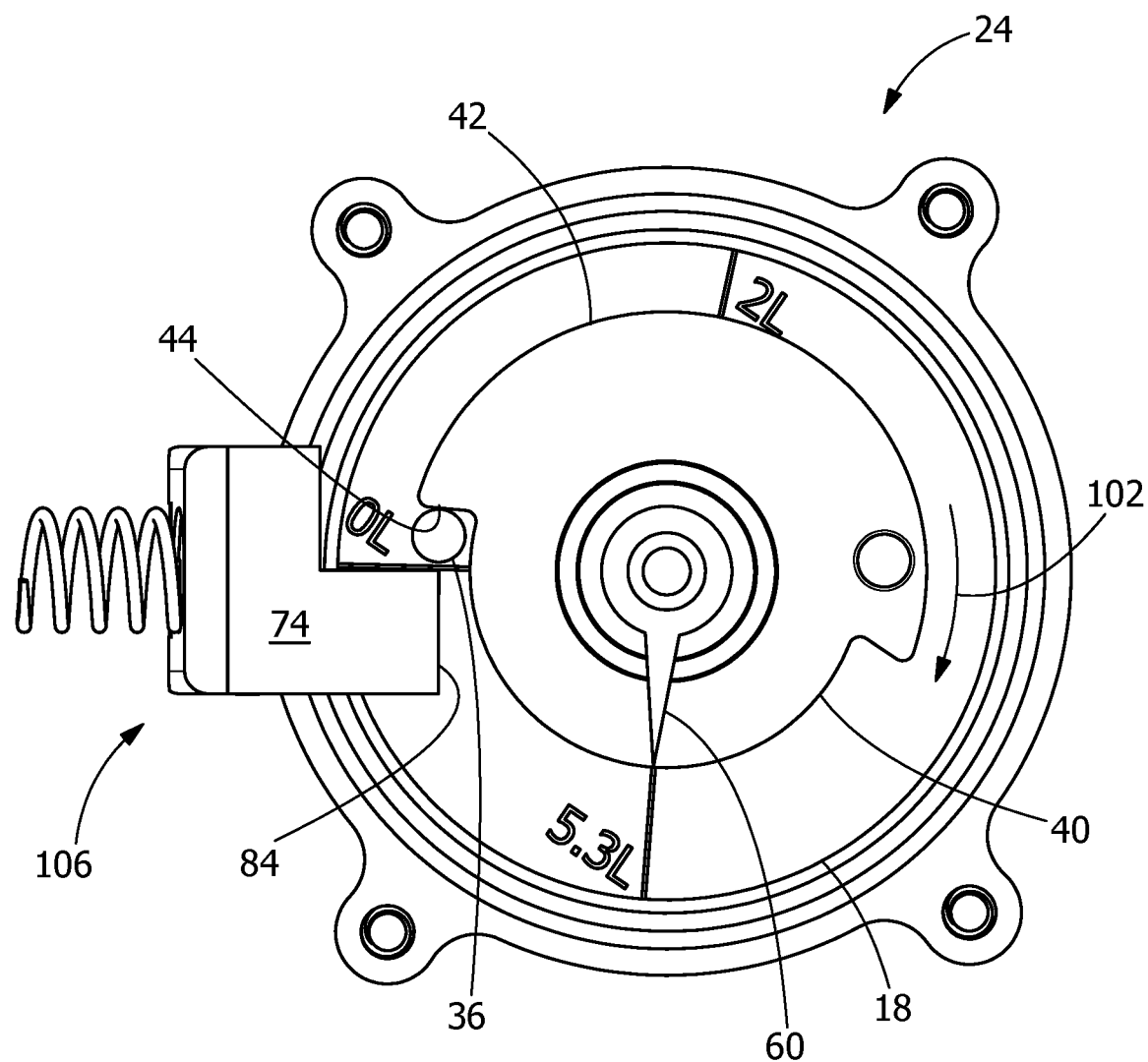
FIG. 10 is a plan view of the mechanical activation system of FIG. 9, after rotational movement of at least a portion of mechanical device 24 in a clockwise direction.

As further shown in FIGS. 2 and 3, mechanical activation system 10 includes a mechanical device 74 that is pivotably or rotatably connected in housing 22 about an axis 80 by bearings 76, which bearings 76 are secured to a fastener 78 that is connected to a structure 64 connected to housing portion 92. Mechanical device 74 includes a body 75 having an abutment surface 86 abutting and biased by a biasing device 94 such as a spring, which body 75 extending to a protrusion 82 having a surface 84 in sliding contact with one, both, or neither of cam surface 42 of cam 40 and cam surface 54 of cam 52 during operation of mechanical activation system 10. As shown, mechanical device 74 further includes a leg 88 having an abutment surface 90 abutting and biased by a biasing device 96. The torsional force generated as a result of the force applied by biasing device 94 to abutment surface 86 of mechanical device 74 is greater than the opposed torsional force generated as a result of the force applied by biasing device 96 to abutment surface 90 of leg 88 of mechanical device 74, and as a result, mechanical device 74 is urged to rotate in a clockwise direction, defining an engaged position 106 (FIG. 9). During operation of mechanical activation system 10, surface 84 of mechanical device 74 is supported by and in sliding contact with one or both of cam surface 42 of cam 40 and cam surface 54 of cam 52, as will be discussed in further detail below. When surface 84 of mechanical device 74 is supported by at least one of cam surfaces 42, 54, mechanical device 74 is urged from an engaged position 106 (FIG. 9) to a disengaged position 104 (FIG. 4). When mechanical device 74 is in disengaged position 104 (FIG. 4), valve 98 is closed. When mechanical device 74 is in engaged position 106 (FIG. 9), valve 98 is open. In one embodiment, when valve 98 is open, in which external device 12 (FIG. 1) such as an aircraft such as a helicopter, nonessential subsystems of the aircraft are no longer supplied hydraulic fluid, preventing the amount of hydraulic fluid contained in reservoir 14 (FIG. 1) from being sufficiently further depleted to reach a critical value. In this embodiment, the reduced level of hydraulic fluid contained in reservoir 14 (FIG. 1) is referred to as a predetermined threshold critical value, such that when mechanical device 74 is actuated or urged into rotational movement from the disengaged position 104 (FIG. 4) to engaged position 106 (FIG. 9), the level of hydraulic fluid contained in reservoir 14 (FIG. 1) is prevented from reaching a critical value, which could result in damage to the aircraft.

It is to be understood that in other embodiments, the mechanical activation system may be designed to automatically monitor a parameter other than hydraulic fluid, such as temperature, pressure or other parameters associated with a mechanical linkage. Furthermore, in other embodiments, the predetermined threshold critical value and critical value of the parameter being monitored or maintained by the mechanical activation system may not be representative of minimal values, but may be maximum values, or any value or value range between minimum and maximum operating values of the system of the external device, depending upon application.

FIGS. 4-19 show an exemplary embodiment of mechanical activation system 10 during operation, with the housing and housing portions 22, 66, 92 removed for clarity. While proceeding sequentially through these figures, the orientations will change to more effectively show the interaction between components, and components may be added or removed for clarity. Finally, indicator 60 will be utilized to help show the rotational orientation and/or comparative change of rotational orientation between consecutive figures of mechanical device 24 about axis 26. That is, each of indicator 60, pulley 18, cam 40 and cam 52 rotate about axis 26, and discussion regarding rotational movement of these components is intended to refer to rotation about axis 26.

As shown in FIG. 4, indicator 60 generally corresponds to a fluid level in reservoir 14 (FIG. 1), which in the exemplary embodiment is approximately 5.3 liters. In another embodiment the maximum fluid level may be greater or less than 5.3 liters. As shown, mechanical device 74 is in disengaged position 104, with surface 84 of mechanical device 74 in sliding contact with cam surface 42 of cam 40. As a result of mechanical device 74 being in disengaged position 104, valve 98 (FIG. 2) is closed, there being no restrictions imposed by mechanical activation system 10 to any subsystems requiring hydraulic fluid. FIG. 4 further shows operator actuation device 70 in an engaged position 112 (see FIG. 12, showing tip 72 of operator actuation device 70 in contact with shoulder 114 of cam surface 56 of cam 52).

Figure 8:
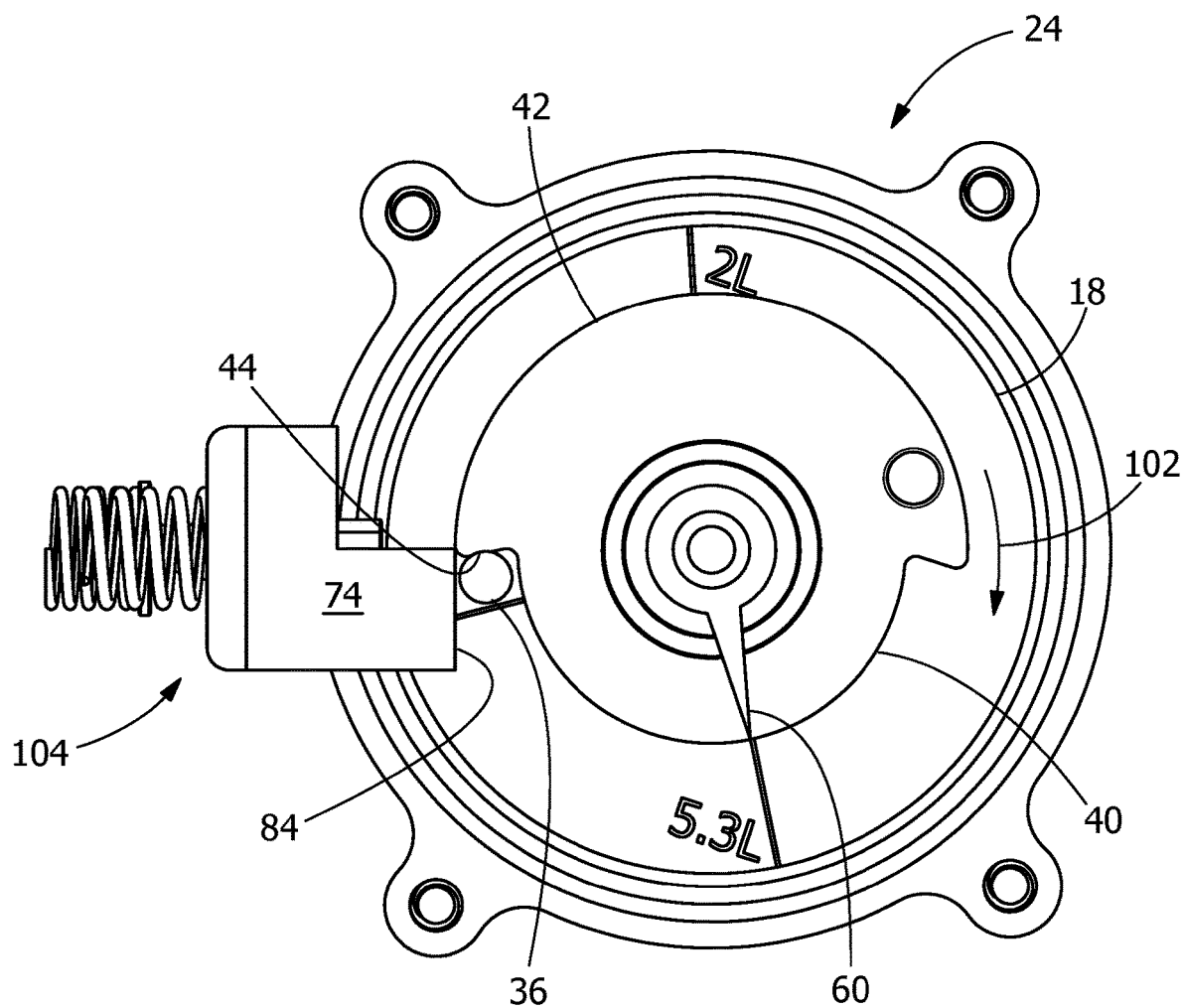
FIG. 8 is a plan view of the mechanical activation system of FIG. 7, after rotational movement of at least a portion of mechanical device 24 in a clockwise direction.

FIGS. 5-8 show simultaneous rotational movement 102 of pulley 18 and cam 40 as a result of protrusion 36 of pulley 18, which is urged into rotational movement by elongated member 20 (FIG. 1) that is connected to plunger 16 (FIG. 1) of external device 12 (FIG. 1). That is, in response to rotational movement 102 of pulley 18, protrusion 36, which extends in the path of and into contact with shoulder 44 of cam surface 42, similarly urges cam 40 into rotational movement 102. FIG. 8 shows surface 84 of mechanical device 74 positioned in contact with cam surface 42 of cam 40 at the juncture of shoulder 44 of cam surface 42. At this moment, mechanical device 74 is still maintained in disengaged position 104.

Figure 11:
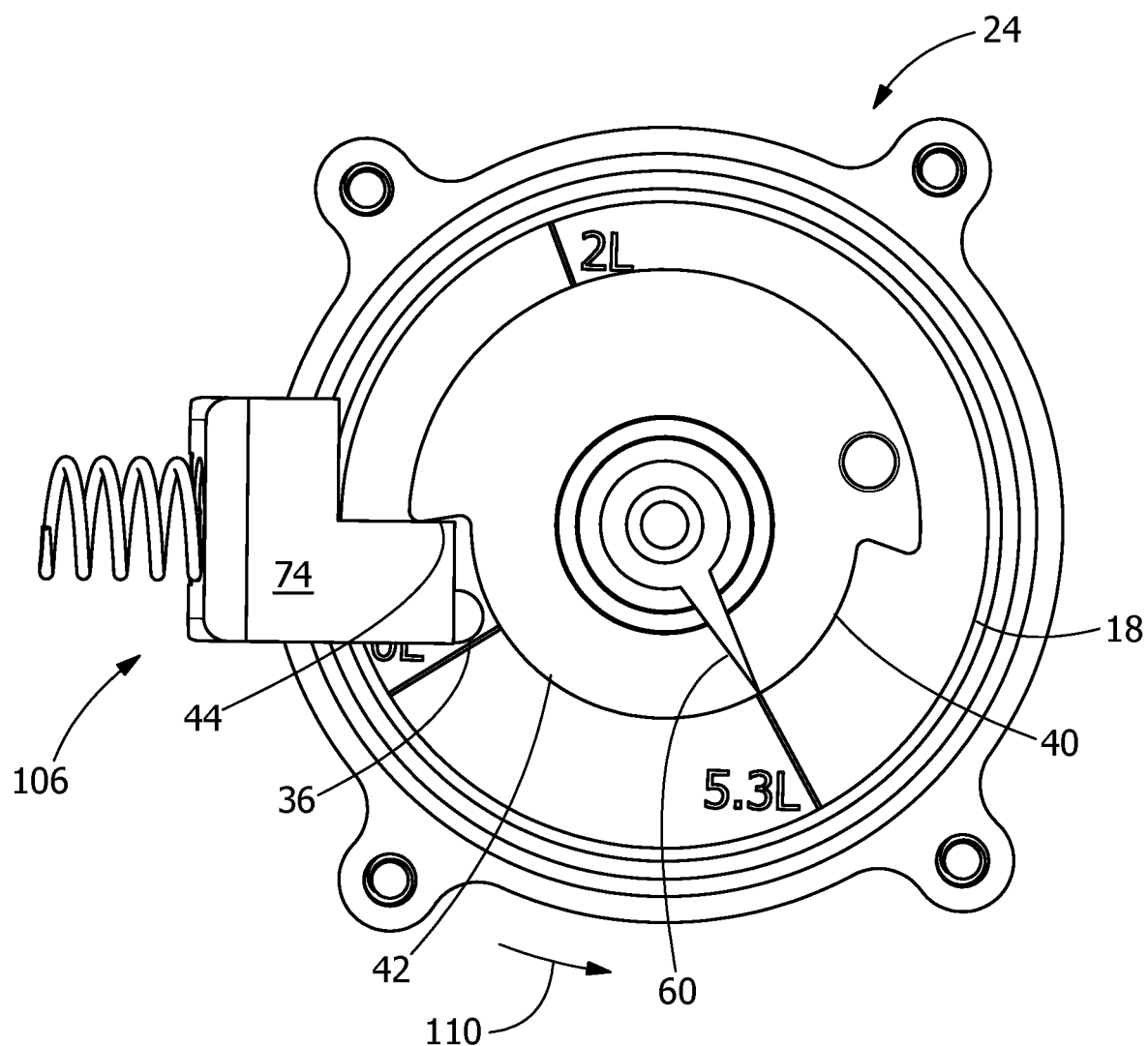
FIG. 11 is a plan view of the mechanical activation system of FIG. 10, after rotational movement of at least a portion of mechanical device 24 in a counter-clockwise direction.

FIG. 9, which shows incremental additional rotational movement 102 of cam 40 past the rotational orientation of cam 40 shown in FIG. 8, results in shoulder 44 of cam surface 42 being rotated past surface 84 of mechanical device 74, and thus being no longer in sliding contact with cam surface 42 of cam 40. As a result of surface 84 no longer being in sliding contact with cam surface 42 of cam 40, biasing device 94, which overcomes biasing device 96, urges mechanical device 74 into rotational movement 108 about axis 80 from disengaged position 104 (FIG. 8) to engaged position 106. In other words, in the exemplary embodiment, in FIG. 9, the rotational orientation of mechanical device 24 shows, defines or corresponds to or achieves a threshold critical value of hydraulic fluid remaining in reservoir 14 (FIG. 1). In response, reaching this depleted threshold critical value of hydraulic fluid, as a result of mechanical device 74 being in an engaged position 106, valve 98 (FIG. 2) prevents the amount of hydraulic fluid contained in reservoir 14 (FIG. 1) from reaching a critical value, such as zero hydraulic fluid or a fluid level sufficiently close to zero so as to damage or risk causing damage to external device 12 (FIG. 1). That is, as a result of engaging valve 98 (FIG. 2), the demand for hydraulic fluid from the essential subsystems is sufficiently reduced such that the amount of hydraulic fluid contained in reservoir 14 (FIG. 1) is not further depleted. FIG. 11 shows rotational movement 110 of pulley 18, corresponding to an increase in the level of fluid contained in reservoir 14 (FIG. 1), with mechanical device 74 remaining in engaged position 106 in contact with shoulder 44 of cam surface 42 of cam 40.

Figure 12:
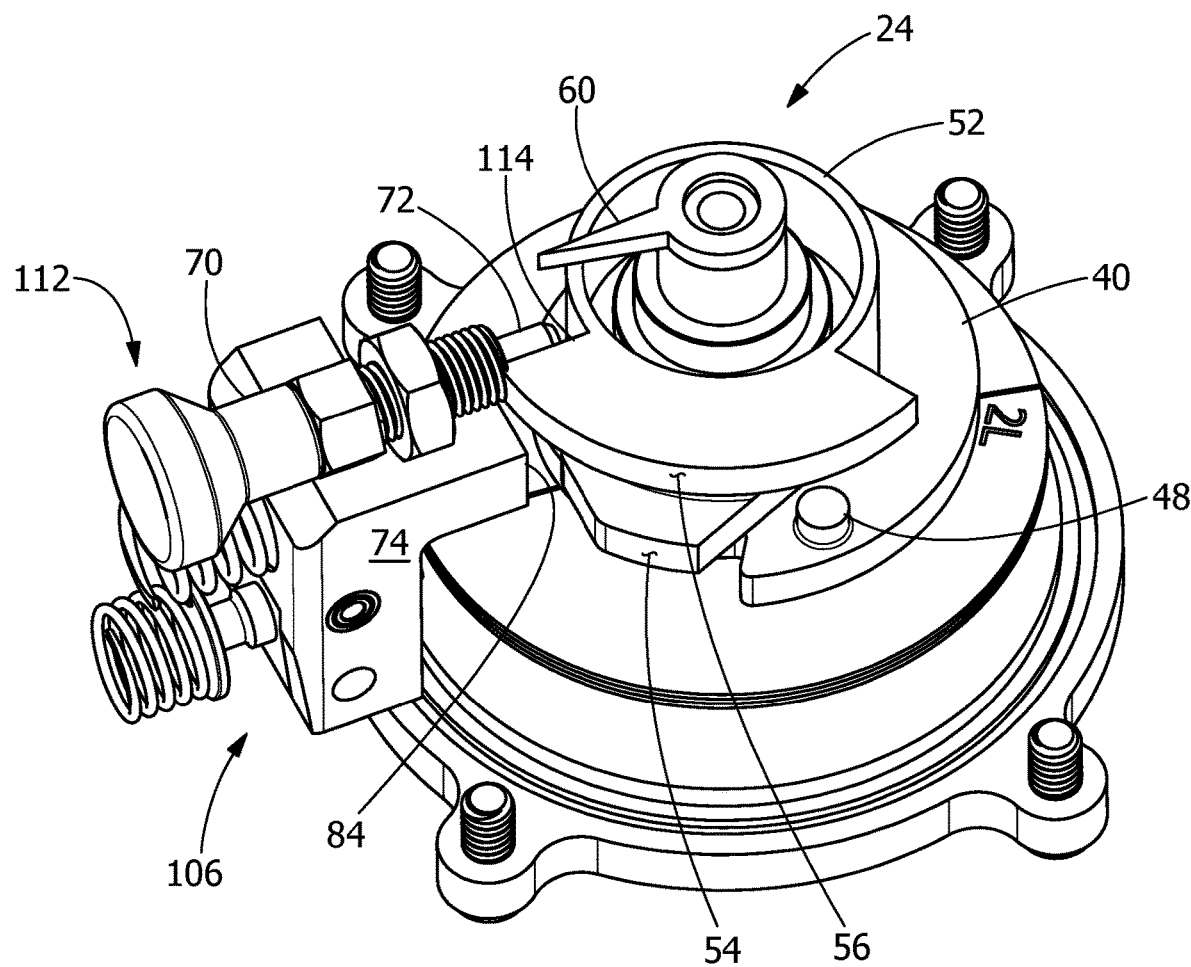
FIG. 12 is a re-oriented upper perspective view of the mechanical activation system of FIG. 11, with components added for purposes of discussion.

FIG. 12 shows a re-orientation of mechanical activation system 10, as compared FIG. 11, in order to better show the operation of operator activation device 70. As shown in FIG. 12, operator activation device 70 is in an engaged position 112 with tip 72 in contact with shoulder 114 of cam surface 56 of cam 52. Simultaneously, mechanical device 74 is in an engaged position 106, with surface 84 being unsupported by or not in contact with surface 54 of cam 52.

Figure 13:
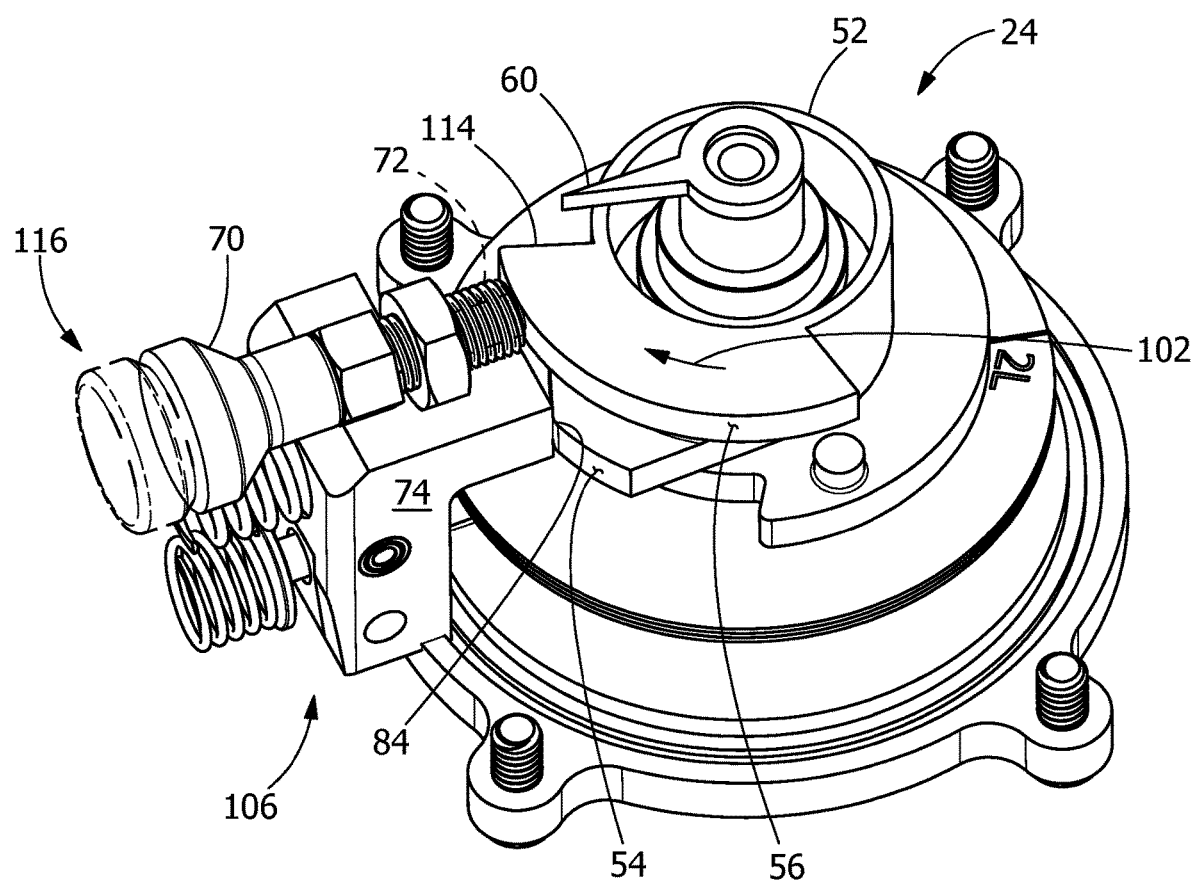
FIG. 13 is an upper perspective view of the mechanical activation system of FIG. 12, after an operator activation device has been actuated from engaged position to a disengaged position, and after rotational movement of at least a portion of mechanical device 24.

As shown in FIG. 13, operator actuation device 70, in response to being manually actuated, such as by a maintenance worker from engaged position 112 (FIG. 12) to disengaged position 116 in which tip 72 is retracted inside the body of operator actuation device 70, tip 72 formerly being in contact with shoulder 114 of cam surface 56 of cam 52. In response to tip 72 being retracted and out of contact with shoulder 114 of cam surface 56, torque biasing member 58 (FIG. 2) urges cam 52 into rotational movement 102 relative to operator actuation device 70.

Figure 14:
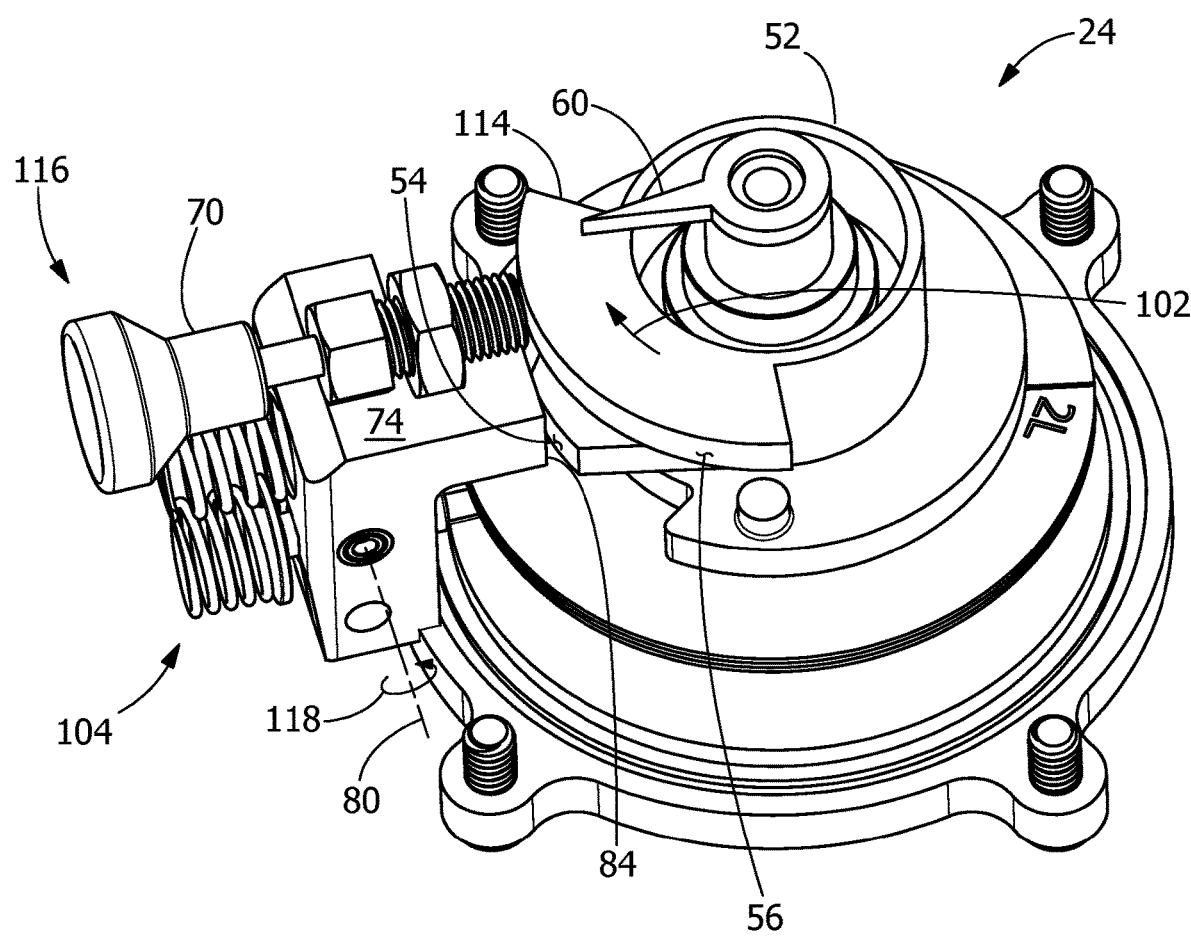
FIG. 14 is an upper perspective view of the mechanical activation system of FIG. 13, after rotational movement of at least a portion of mechanical device 24 in a clockwise direction, resulting in mechanical device 74 being urged from an engaged position to a disengaged position.
Figure 15:
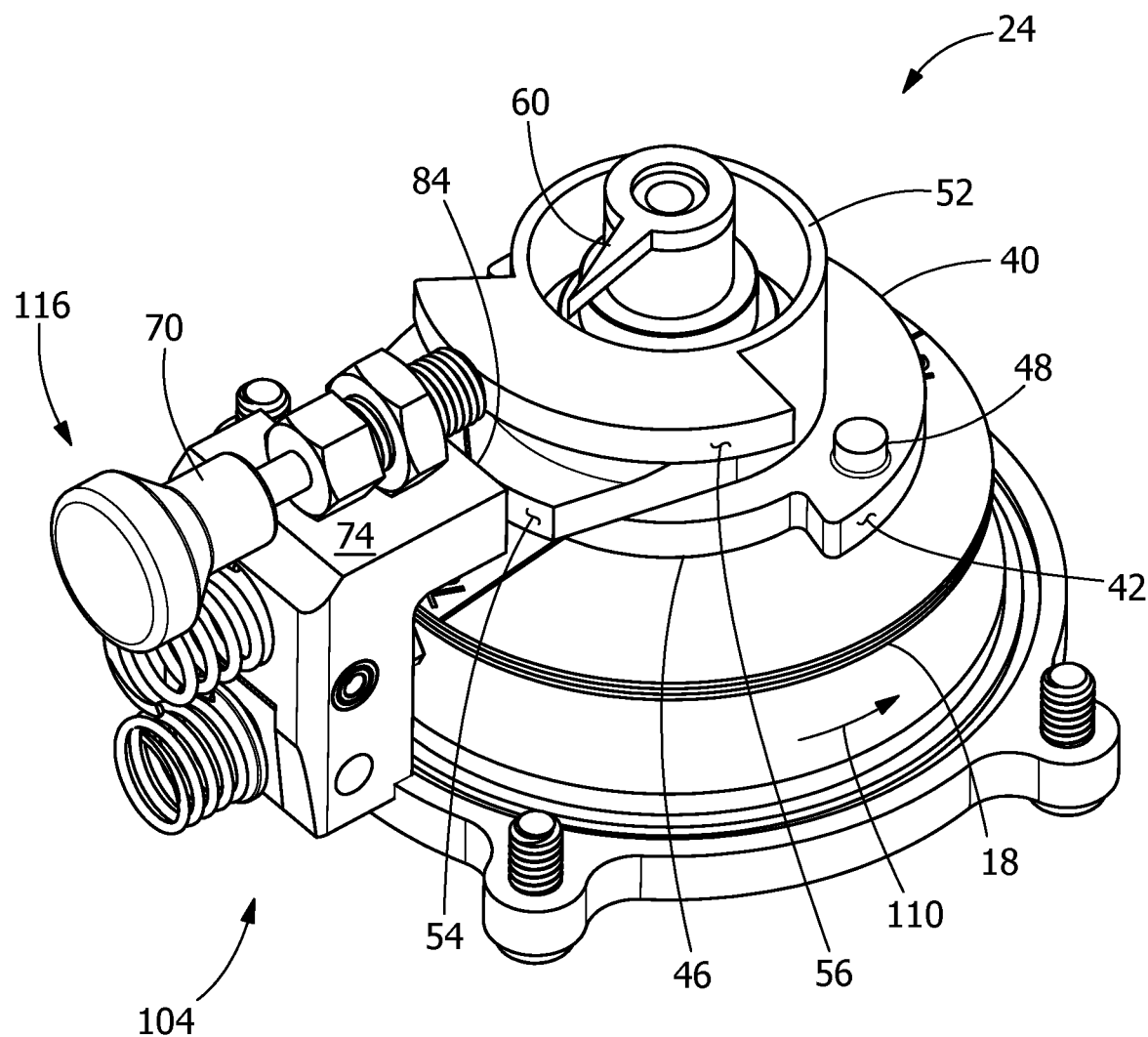
FIG. 15 is an upper perspective view of the mechanical activation system of FIG. 14, after rotational movement of at least a portion of mechanical device 24 in a counter-clockwise direction.

As shown in FIG. 14, a stop 100 (FIG. 3) such as a pin engages cam 52 to prevent over-rotation of cam 52 in rotational movement 102 brought about by torque biasing member 58 (FIG. 2). As a result of torque biasing member 58 (FIG. 2), cam surface 54 of cam 52 is brought into contact with surface 84 of mechanical device 74, urging rotational movement of mechanical device 74 about axis 80 in a direction of rotational movement 118 from engaged position 106 (FIGS. 13 and 14) to disengaged position 104, which disengaged position 104 having been previously discussed. FIG. 15 shows rotational movement 110 of pulley 18, and simultaneously, cam 40 as a result of torque biasing member 46 as previously discussed.

Figure 16:
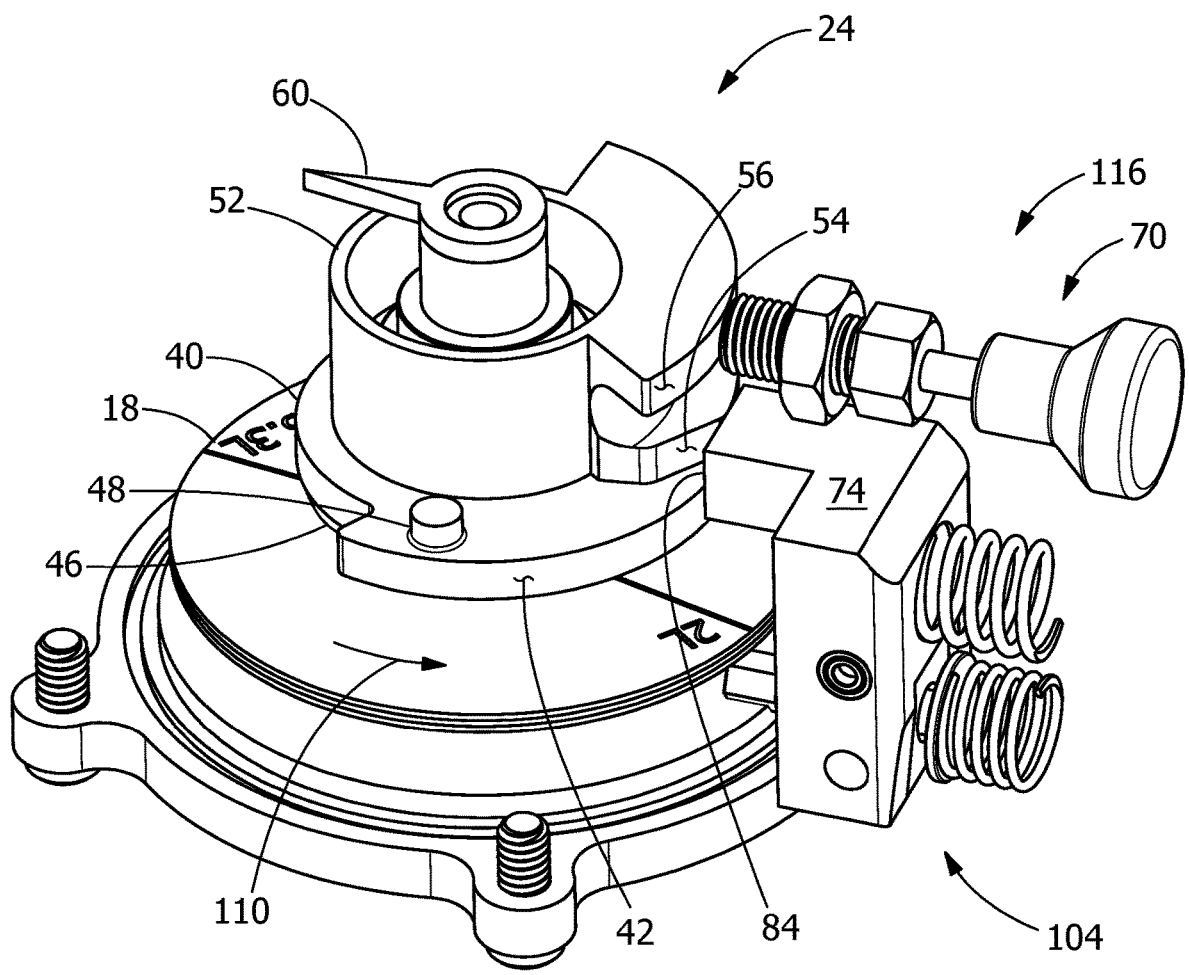
FIG. 16 is a re-oriented upper perspective view of the mechanical activation system of FIG. 15, after rotational movement of at least a portion of mechanical device 24 in a counter-clockwise direction.
Figure 17:
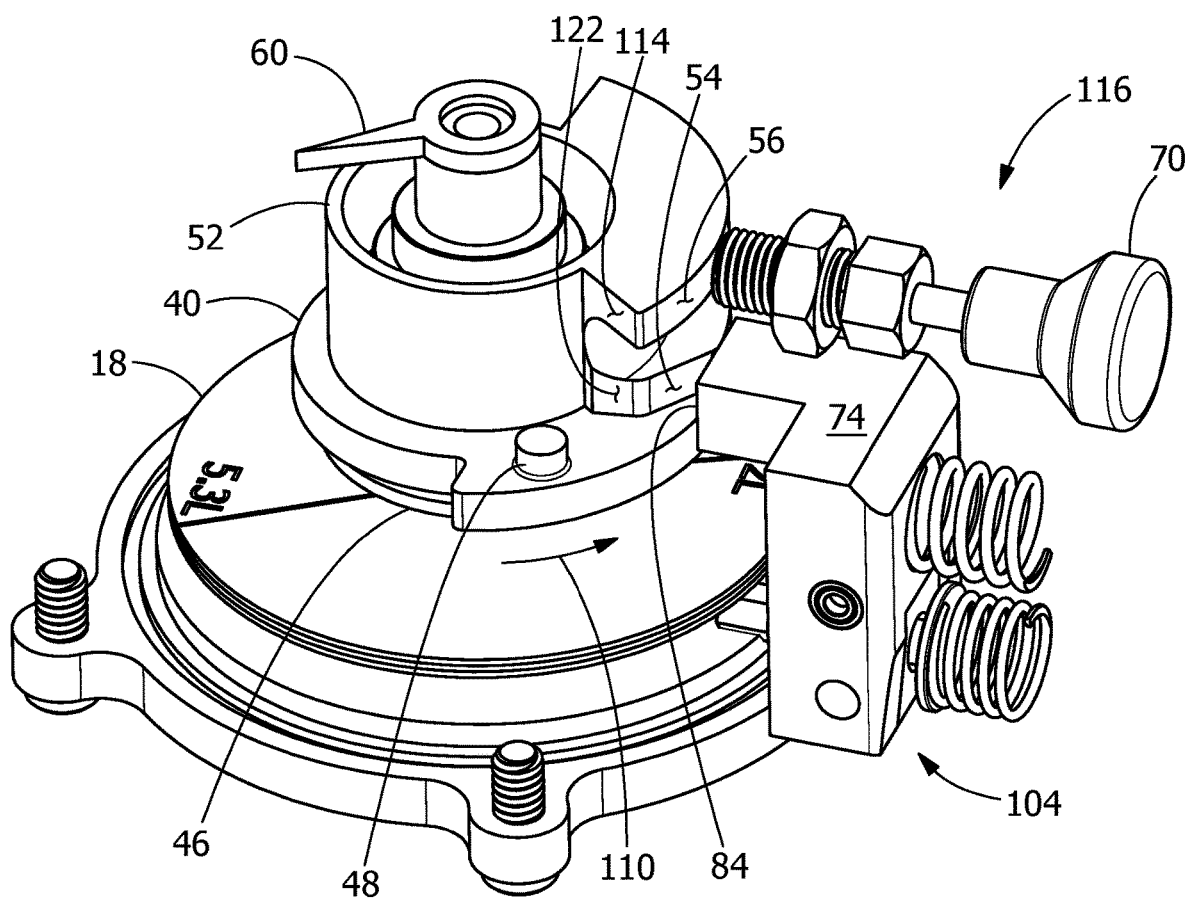
FIG. 17 is an upper perspective view of the mechanical activation system of FIG. 16, after rotational movement of at least a portion of mechanical device 24 in a counter-clockwise direction.
Figure 18:
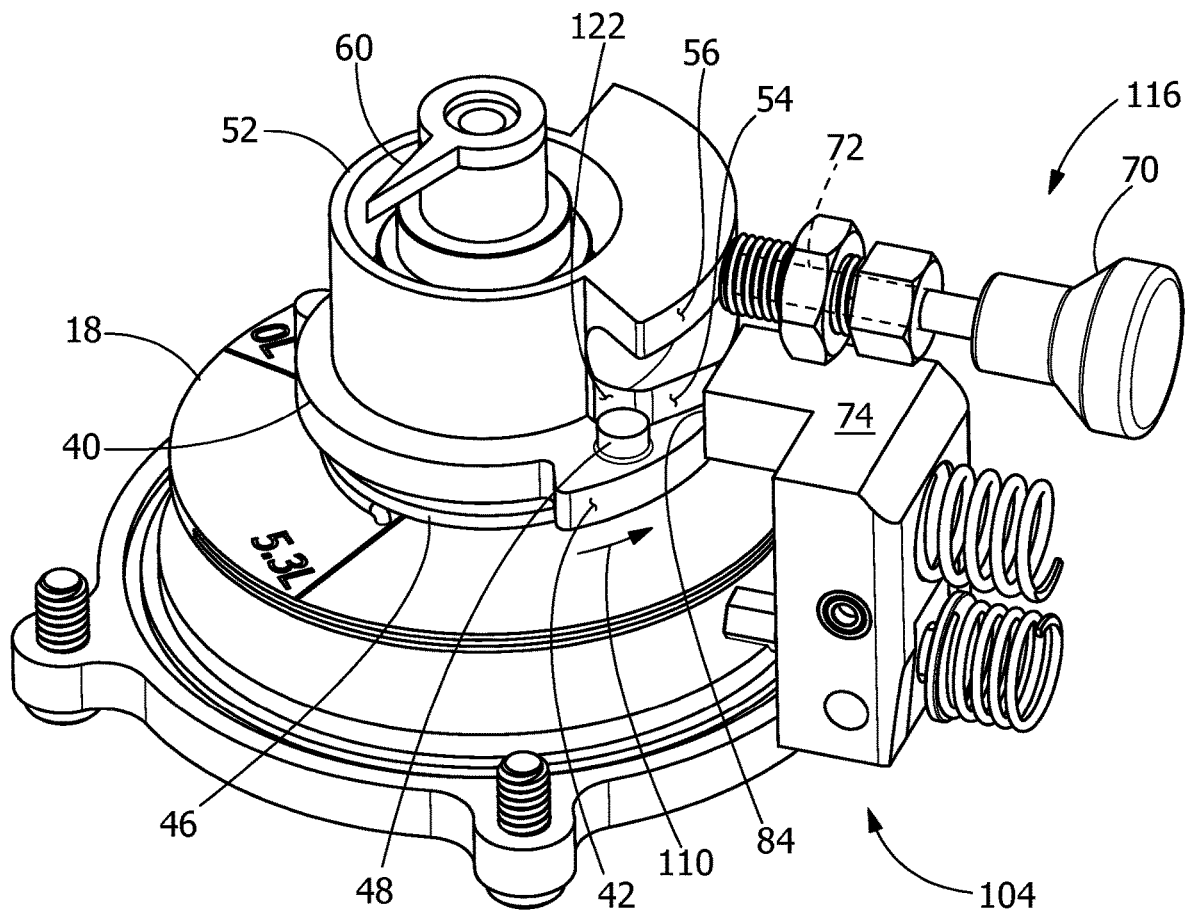
FIG. 18 is an upper perspective view of the mechanical activation system of FIG. 17, after rotational movement of at least a portion of mechanical device 24 in a counter-clockwise direction.

FIG. 16 shows a re-orientation of mechanical activation system 10, as compared FIG. 15, in order to better show the operation of operator activation device 70. As shown in FIGS. 16-18, in response to an increase in the amount of hydraulic fluid in reservoir 14 (FIG. 1) pulley 18 is urged into rotational movement 110, and as a result of torque biasing member 46, simultaneously urges cam 40 into rotational movement 110.

Figure 19:
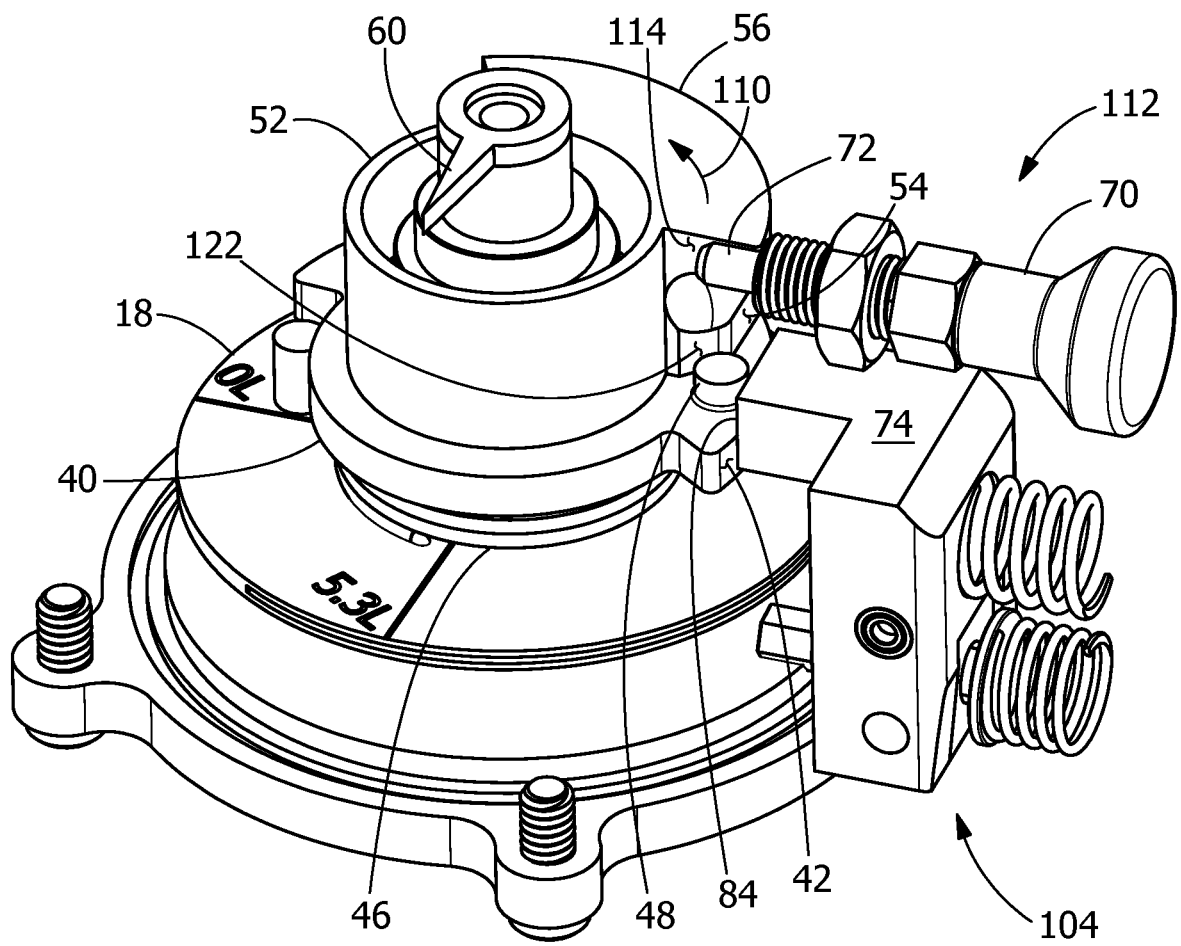
FIG. 19 is an upper perspective view of the mechanical activation system of FIG. 18, after rotational movement of at least a portion of mechanical device 24 in a counter-clockwise direction, resulting in operator activation device being actuated from a disengaged position to an engaged position.

As shown in FIGS. 18-19, protrusion 48 of cam 40 is brought into contact with shoulder 122 of cam surface 54 of cam 52, urging cam 52 in rotational movement 110. In response to sufficient rotational movement 110 of cam 52, as shown in FIG. 19, shoulder 114 of cam surface 56 of cam 52 rotates past tip 72 of operator actuation device 70, permitting tip 72 to automatically extend, thereby automatically urging (resetting) operator actuation device 70 from disengaged position 116 (FIG. 18) to engaged position 112. By virtue of this novel mechanical arrangement, only a single operator input, i.e., actuating the operator actuation device 70 to disengaged position 116 (FIG. 18), is required, as urging the operator actuation 70 from disengaged position 116 (FIG. 18) to engaged position 112 occurs automatically, without requiring electrical power, fluid power or other type of power that could introduce another opportunity for failure and reduce reliability of the system.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A mechanical activation system comprising:
a rotatable first mechanical device mechanically connectable to an external device, a rotational orientation of the first mechanical device controllable by the external device, the rotational orientation representative of a parameter of the external device;
a pivotable second mechanical device slidably supported in a disengaged position by a first cam surface of the first mechanical device;
wherein in response to the parameter reaching a predetermined threshold critical value, at least a portion of the first mechanical device is urged into rotational movement to a predetermined rotational orientation, and the second mechanical device is urged from the disengaged position to an engaged position for opening a valve for preventing the parameter from reaching a critical value; and
an operator actuation device in an engaged position in contact with a second cam surface of the first mechanical device;
wherein in response to the operator actuation device being manually actuated from the engaged position to a disengaged position, the second cam surface is urged into rotational movement to urge the second mechanical device from the engaged position toward the disengaged position;
wherein the operator actuation device is automatically returnable to the engaged position by the mechanical activation system.

2. The mechanical activation system of claim 1, wherein the parameter is a fluid level of the external device.

3. The mechanical activation system of claim 1, wherein the second mechanical device includes a biasing device for biasing one end of the second mechanical device into contact with the first cam surface.

4. The mechanical activation system of claim 1, wherein the first mechanical device includes a pulley for receiving an elongated member extending between the pulley and the external device.

5. The mechanical activation system of claim 4, wherein the pulley includes a protrusion extending in a path for contacting and urging a first cam having the first cam surface into rotational movement toward the predetermined rotational orientation.

6. The mechanical activation system of claim 4, wherein the pulley is connected to a first torque biasing member.

7. The mechanical activation system of claim 1, wherein a first cam has the first cam surface.

8. The mechanical activation system of claim 1, wherein a second cam has the second cam surface.

9. The mechanical activation system of claim 7, wherein the first cam is connected to a second torque biasing member.

10. The mechanical activation system of claim 8, wherein the second cam is connected to a third torque biasing member.

11. The mechanical activation system of claim 10, wherein in response to the operator actuation device being manually actuated from the engaged position to a disengaged position, the third torque biasing member applies sufficient torque to urge the second cam having a third cam surface into rotational movement, the third cam surface urges the second mechanical device from the engaged position toward the disengaged position.

12. The mechanical activation system of claim 11 further comprises a stop to prevent over-rotation of the second cam applied by the third torque biasing member.

13. The mechanical activation system of claim 11, wherein the first cam includes a protrusion extending in a path for contacting and urging the second cam into rotational movement for actuating the operator actuation device from the disengaged position to the engaged position.

14. A mechanical activation system comprising:
a rotatable first mechanical device comprising:
a pulley for receiving an elongated member extending between the pulley and an external device, a rotational orientation of the pulley controllable by the external device, the rotational orientation representative of a parameter of the external device;
a first cam having a first cam surface; and
a second cam having a second cam surface and a third cam surface; and
a pivotable second mechanical device slidably supported in a disengaged position by the first cam surface;
wherein in response to the parameter reaching a predetermined threshold critical value, the pulley and the first cam are urged into rotational movement to a predetermined rotational orientation, the second mechanical device is urged from the disengaged position to an engaged position for opening a valve for preventing the parameter from reaching a critical value; and
an operator actuation device in an engaged position in contact with the second cam surface;
wherein in response to the operator actuation device being manually actuated from the engaged position to a disengaged position, the second cam is urged into rotational movement, the third cam surface urges the second mechanical device from the engaged position toward the disengaged position;

wherein the operator actuation device is automatically returnable to the engaged position by the mechanical activation system.

15. The mechanical activation system of claim 14, wherein the parameter is a fluid level of the external device.

16. The mechanical activation system of claim 14, wherein the second mechanical device includes a biasing device for biasing one end of the second mechanical device into contact with the first cam surface.

17. The mechanical activation system of claim 14, wherein the pulley includes a protrusion extending in a path for contacting and urging a first cam having the first cam surface into rotational movement toward the predetermined rotational orientation.

18. The mechanical activation system of claim 14, wherein the pulley is connected to a first torque biasing member, the first cam is connected to a second torque biasing member, and the second cam is connected to a third torque biasing member.

19. The mechanical activation system of claim 18, wherein in response to the operator actuation device being manually actuated from the engaged position to a disengaged position, the third torque biasing member applies sufficient torque to urge the second cam surface into rotational movement, wherein the second cam has a third cam surface, and the third cam surface urges the second mechanical device from the engaged position toward the disengaged position.

20. The mechanical activation system of claim 19 further comprises a stop to prevent over-rotation of the second cam by the third torque biasing member.

* * * * *